United States Patent
Zhu et al.

(10) Patent No.: US 9,110,746 B2
(45) Date of Patent: Aug. 18, 2015

(54) MAGNETIC TUNNEL JUNCTION BASED RANDOM NUMBER GENERATOR

(75) Inventors: Xiaochun Zhu, San Diego, CA (US); Wenqing Wu, San Diego, CA (US); David M. Jacobson, San Diego, CA (US); Seung H. Kang, San Diego, CA (US); Kendrick H. Yuen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 13/602,776

(22) Filed: Sep. 4, 2012

(65) Prior Publication Data

US 2014/0067890 A1    Mar. 6, 2014

(51) Int. Cl.
*G06F 7/58*    (2006.01)

(52) U.S. Cl.
CPC .............. *G06F 7/582* (2013.01); *G06F 7/588* (2013.01)

(58) Field of Classification Search
None
See application file for complete search history.

(56) References Cited

U.S. PATENT DOCUMENTS

| | | | |
|---|---|---|---|
| 7,881,099 B2 | 2/2011 | Lim | |
| 7,936,592 B2 | 5/2011 | Wang et al. | |
| 8,495,118 B2 * | 7/2013 | Wang et al. | 708/250 |
| 8,521,795 B2 * | 8/2013 | Fukushima et al. | 708/250 |
| 2010/0109660 A1 * | 5/2010 | Wang et al. | 324/244 |
| 2010/0174766 A1 | 7/2010 | Weeks et al. | |
| 2011/0123022 A1 | 5/2011 | Oishi et al. | |
| 2012/0026784 A1 | 2/2012 | Kanai et al. | |
| 2013/0073598 A1 * | 3/2013 | Jacobson et al. | 708/252 |
| 2014/0022837 A1 * | 1/2014 | Wang et al. | 365/158 |
| 2014/0067890 A1 * | 3/2014 | Zhu et al. | 708/250 |
| 2014/0136583 A1 * | 5/2014 | Hyde et al. | 708/250 |

FOREIGN PATENT DOCUMENTS

| | | |
|---|---|---|
| EP | 2163984 A1 | 3/2010 |
| JP | 2011013901 A | 1/2011 |
| WO | 2010090328 A1 | 8/2010 |

OTHER PUBLICATIONS

International Search Report and Written Opinion—PCT/US2013/058083—ISA/EPO—Jan. 23, 2014.

* cited by examiner

*Primary Examiner* — David H Malzahn
(74) *Attorney, Agent, or Firm* — Sam Talpalatsky; Nicholas J. Pauley; Paul Holdaway (57) ABSTRACT

Embodiments of the disclosure are directed to generating a random number. An embodiment of the disclosure passes a current from a read operation through a magnetic tunnel junction (MTJ) to cause a first magnetization orientation of a free layer to switch to a second magnetization orientation, the switch in magnetization orientation causing a change in a resistance of the MTJ, and periodically samples the resistance of the MTJ to generate a bit value for the random number.

47 Claims, 7 Drawing Sheets

MAGNETIC TUNNEL JUNCTION BASED RANDOM NUMBER GENERATOR

FIELD OF DISCLOSURE

The disclosure relates to generating random numbers, and particularly to generating random numbers using a magnetic tunnel junction.

BACKGROUND

Encryption keys are typically random "0" and "1" number series generated by a random number generator (RNG). The randomness of the "0" and "1" numbers should be unpredictable and un-cloneable, including to those who know how the random number generator is designed. Most devices that generate such random numbers, however, are expensive, require high power, generate data slowly, and can easily be hacked.

SUMMARY

Embodiments of the disclosure are directed to generating a random number. An embodiment of the disclosure passes a current from a read operation through a magnetic tunnel junction (MTJ) to cause a first magnetization orientation of a free layer to switch to a second magnetization orientation, the switch in magnetization orientation causing a change in a resistance of the MTJ, and periodically samples the resistance of the MTJ to generate a bit value for the random number.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration," Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Encryption keys are typically random "0" and "1" number series generated by a random number generator (RNG). The randomness of the "0" and "1" numbers should be unpredictable and un-cloneable, including to those who know how the random number generator is designed. Most devices that generate such random numbers, however, are expensive, require high power, generate data slowly, and can easily be hacked.

Embodiments of the invention utilize a magnetic tunnel junction (MTJ) to generate a random number series. Embodiments of the invention can be embedded in a system on a chip (SoC), are inexpensive to make, have low power consumption, generate data quickly, and are not easily hacked.

Figure 1:
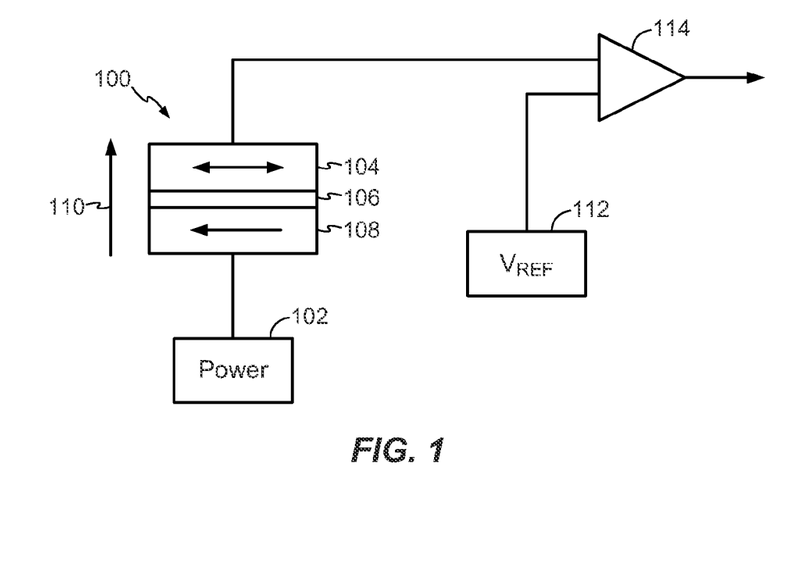
FIG. 1 illustrates art exemplary magnetic tunnel junction according to at least one embodiment of the invention.

FIG. 1 illustrates a simplified view of an MTJ 100. MTJ 100 includes at least a ferromagnetic free layer 104 and a ferromagnetic reference (i.e. pinned) layer 108. Free layer 104 and reference layer 108 are separated by a non-magnetic spacer layer 106, which is an insulating barrier sufficiently thin that electrons can tunnel through it from reference layer 108 to free layer 104. This is called tunnel magnetoresistance (TMR). The magnetization orientation of reference layer 108 is pinned in a predetermined direction (as indicated by the single arrow) while the magnetization orientation of free layer 104 is free to rotate (as indicated by the double arrow). The magnetization orientations of free layer 104 and reference layer 108 are either parallel or anti-parallel relative to each other.

The resistance, and thus bit state, of MTJ 100 is determined by the relative orientation of the magnetization orientations of layers 104 and 108. MTJ 100 is in the low resistance state when the magnetization orientations of layers 104 and 108 are parallel relative to each other and in the high resistance state when the magnetization orientations of layers 104 and 108 are anti-parallel relative to each other. The low resistance state can represent a "0" bit and the high resistance state can represent a "1" bit, or vice versa.

As a current 110 flows through MTJ 100 from a power source 102, it may become spin polarized in a direction perpendicular to the in-plane magnetization orientation of free layer 104, imparting a spin transfer torque (STT) on free layer 104. Spin polarization is caused by current 110 passing though a sufficiently thick ferromagnetic layer. This may be reference layer 108 or another magnetic layer proximate free layer 104. Further, while current 110 is shown flowing first through reference layer 108 and then free layer 104, this could be reversed.

Any torque applied to the magnetic moment of free layer 104 will give rise to a change in magnetic moment parallel to the torque. A change in the orientation of the magnetic moment is called magnetization precession. When a sufficient level of polarized current, and therefore STT, is applied to free layer 104, the magnetization motion of free layer 104 will have sufficient energy to overcome the energy barrier between the parallel and anti-parallel magnetization orientations. As a result, the magnetization orientation of free layer 104 will switch to the opposite orientation, e.g. from parallel to the magnetization orientation of reference layer 108 to anti-parallel. This is called magnetization damping.

In order to read the bit state of MTJ 100, the drop in voltage of current 110 across MTJ 100 and a reference voltage 112 are supplied to a comparator 114. The drop in voltage of current 110 as it flows through MTJ 100 is a function of the resistance of MTJ 100, which is a function of the resistance caused by free layer 104 oscillating between being either parallel or anti-parallel to reference layer 108. The resistance is highest when the magnetization orientation of free layer 104 is anti-parallel to the magnetization orientation of reference layer 108, indicating a "1," and lowest when the magnetization orientation of free layer 104 is parallel to the magnetization orientation of reference layer 108, indicating a "0." Reference voltage 112 should be selected such that the voltage drop of current 110 will be less than reference voltage 112 when the resistance of MTJ 100 should indicate a "0" and higher than reference voltage 112 when the resistance of MTJ 100 should indicate a "1."

In order to generate a random number series, the magnetization orientation of free layer 104 must be randomly switched and the resistance across MTJ 100 must be periodically sampled in order to generate a series of bits. Generally, the pumped-in energy by STT within MTJ 100 must be sufficiently high to excite a magnetic oscillation (not necessarily reaching the two orientations). The higher the current 110 in MTJ 100, the larger the magnetic oscillation magnitude. Only when the current is further increased to exceed beyond a critical value, the magnetic moment will be switched to one of two stable orientations depending on the STT current direction. Thermal agitation, or thermal fluctuation, adds additional energy, exciting the random movement of the magnetic spins in MTJ 100. The higher and longer applied current 110 in MTJ 100, the possibly higher temperature of MTJ 100, and thus the greater the thermal agitation.

The following drawings illustrate embodiments of the invention that modify the general operation of MTJ 100 just described.

Figure 2:
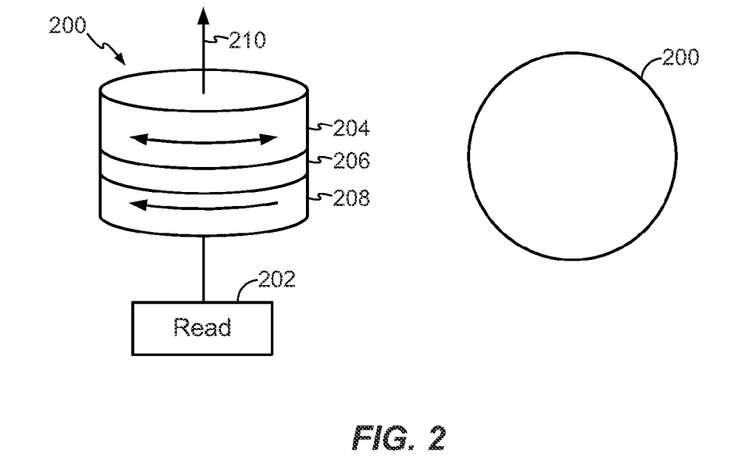
FIG. 2 illustrates an exemplary magnetic tunnel junction according to at least one embodiment of the invention.

FIG. 2 illustrates an embodiment of the invention that utilizes only thermal agitation, instead of STT, to randomly switch the orientation of the magnetization orientation of a free layer. An MTJ 200 comprises at least a free layer 204, a barrier layer 206, and a reference layer 208. A current 210 generated by a read operation 202 passes through MTJ 200.

In the embodiment of FIG. 2, MTJ 200 has a circular shape when viewed from the perspective of current 210 as it enters MTJ 200. Because MTJ 200 is circular, the energy barrier of free layer 204 is 0 or close to 0. That is, it takes no energy or very little energy to switch the magnetization orientation of free layer 204 because a circle is not biased toward a particular orientation. Since only a small amount of energy is required to overcome the energy barrier, thermal agitation alone is sufficient to switch the magnetization orientation of free layer 204. It is therefore unnecessary to spin polarize current 210 to create an STT in free layer 204.

Typically, current 110 is supplied to MTJ 100 during a write operation because writes require a higher current than reads and thus generate sufficient STT to change the magnetization orientation of free layer 104. However, since the circular MTJ 200 has such a low energy barrier and thus does not require a spin polarized current, the amount of current supplied by a write operation is unnecessary. Rather, current 210 from read operation 202 will generate sufficient thermal agitation to cause the magnetization orientation of free layer 204 to switch. Additionally, the power supply for read operation 202 can be a direct current (DC), which requires a much simpler control circuitry for unipolar current generation than an alternating current (AC), which requires a much more complicated circuitry design for bipolar current generation.

It is the destabilization caused by the thermal agitation, not the STT generated by a spin polarized current that changes the magnetization orientation of free layer 204. Further, the magnetization orientation of free layer 204 will change randomly because of the random nature of thermal agitation. This randomness is not cloneable, making this embodiment well-suited of generating random numbers for cryptography applications.

In order to keep the memory-less feature of random number generation, the switching of the magnetization orientation of free layer 204 has to be completed at a fast speed. Therefore, the damping constant of MTJ 200 needs to be relatively high, for example, greater than or equal to 0.1. This can be accomplished by material engineering for the free layer or the multi-layer stack, such as using a platinum (Pt) capping layer proximate free layer 204 (not shown).

MTJ 200 is a device utilizing purely thermal agitation to cause the oscillation of the magnetic moment, and therefore generate random numbers. No additional write circuitry is needed. STT is also minimized or even completely eliminated in this device, since STT will cause the preference of one orientation, i.e. more 1s than 0s or more 0s than is depending on the direction of the read current applied. In order to minimize or even completely eliminate STT, the free layer of MTJ 200 needs to be tuned thick, for example, greater than 2 nm, or the reference layer of MTJ 200 needs to be tuned thin, for example, smaller than 2 nm, or the damping constant of MTJ 200 needs to be tuned relatively high, for example, greater than or equal to 0.1, as described above.

As described above with reference to MTJ 100, MTJ 200 utilizes TMR to sense the magnetization orientation of free layer 204. In an alternative embodiment, MTJ 200 can instead utilize giant magnetoresistance (GMR).

As the magnetization orientation of free layer 204 changes, the resistance of MTJ 200 changes. The smaller the diameter of MTJ 200, the higher its oscillation frequency. Likewise, the larger the diameter of MTJ 200, the lower its oscillation frequency. Tuning MTJ 200 to a smaller size can achieve higher data rate for the random number generation.

Figure 3:
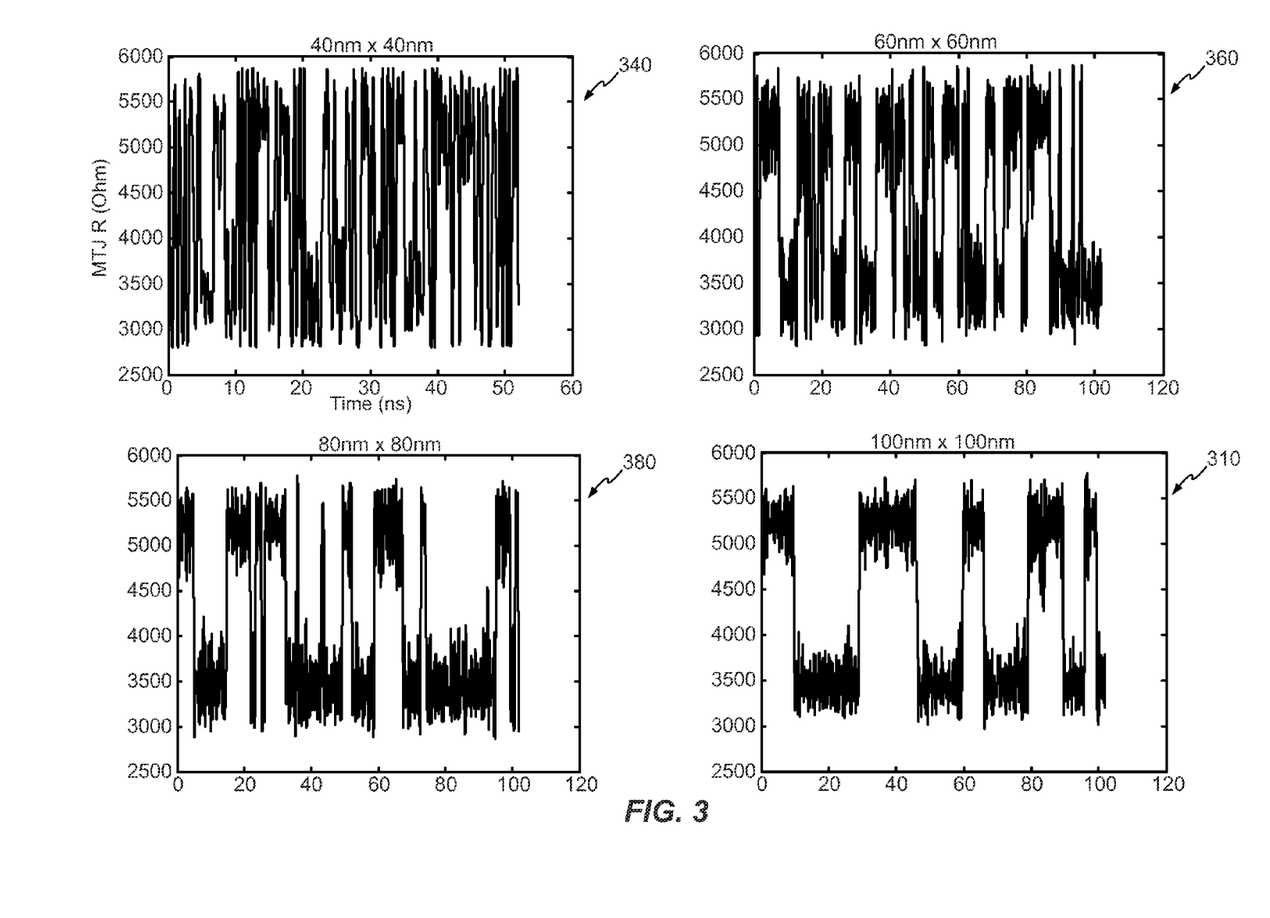
FIG. 3 illustrates the relationship between the diameter of a magnetic tunnel junction and its oscillation frequency.

FIG. 3 shows several graphs illustrating the relationship between the size of MTJ 200 and the oscillation frequency. Graph 340 shows the relationship between the resistance of a 40 nanometer diameter MTJ (in ohms) over time (in nanoseconds). Graph 360 shows the relationship between the resistance of a 60 nanometer diameter MTJ over time. Graph 380 shows the relationship between the resistance of an 80 nanometer diameter MTJ over time. Graph 310 shows the relationship between the resistance of a 100 nanometer diameter MTJ over time. As shown, the larger the diameter of the MTJ, the lower its oscillation frequency. As can also be seen, the probability of a high resistance or a low resistance is approximately 50%.

To generate a random number series from this resistance output, the resistance must be periodically sampled, for example, every 10 ns. The sampling frequency may be adjusted to account for the size of the MTJ or the amount of current, among other factors.

Figure 4:
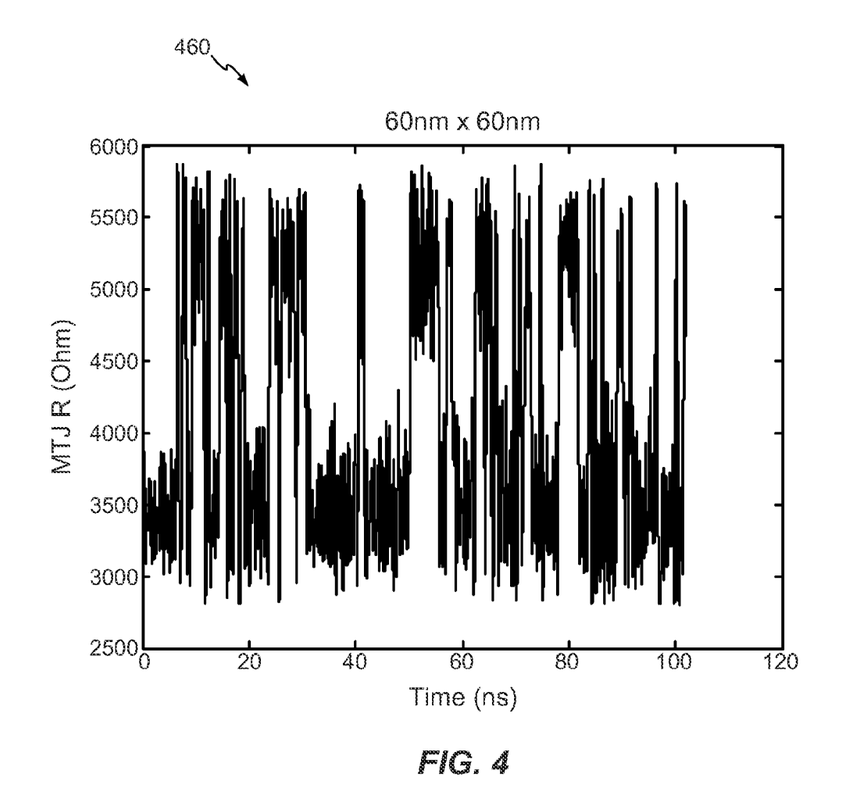
FIG. 4 illustrates the impact of spin-transfer torque on the embodiment of FIG. 2.

FIG. 4 shows a graph 460 of a 60 nanometer diameter MTJ 200. Here, the current has been spin polarized to some degree, which may cause the magnetization orientation of the free layer to stay fixed for a longer period of time because the thermal agitation will have to build up sufficiently to overcome the generated STT. Even in this situation, however, the entropy generated by the bias to one state can still provide a good random number series.

Figure 5:
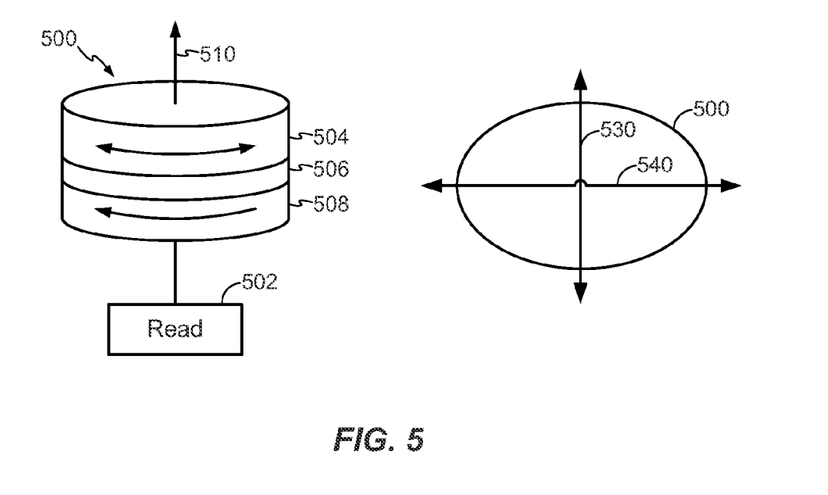
FIG. 5 illustrates an exemplary magnetic tunnel junction according to at least one embodiment of the invention.

FIG. 5 illustrates an exemplary MTJ according to at least one embodiment of the invention. MTJ 500 comprises at least a free layer 504, a barrier layer 506, and a reference layer 508. A current 510 generated by a read operation 502 passes through MTJ 500. MTJ 500 is elliptical when viewed from the perspective of current 510 as it enters MTJ 500. MTJ 500 has an aspect ratio slightly larger than 1 but less than 1.6. The following table shows exemplary sizes of MTJ 500:

| Short Axis | 40 nm | 40 nm | 50 nm | 50 nm | 50 nm | 60 nm |
|---|---|---|---|---|---|---|
| Long Axis | 50 nm | 60 nm | 60 nm | 70 nm | 80 nm | 80 nm |

Anisotropy is induced in-plane along the short axis 530 of MTJ 500. This anisotropy is induced by creating a stress along short axis 530. Shape anisotropy is in-plane along the long axis 540 of MTJ 500. Thus, the effective anisotropy of MTJ 500 becomes 0 because the shape anisotropy along long axis 540 contradicts the induced stress anisotropy along short axis 530. Accordingly, as with the circular MTJ 200, MTJ 500 has no stable magnetization orientation and therefore the magnetization orientation of free layer 504 will rotate in-plane forever, without ever staying in one position.

As with MTJ 200, thermal agitation alone is sufficient to switch the magnetization orientation of free layer 504. And as with MTJ 200, a read operation 502 is sufficient to generate this thermal agitation.

Figure 6:
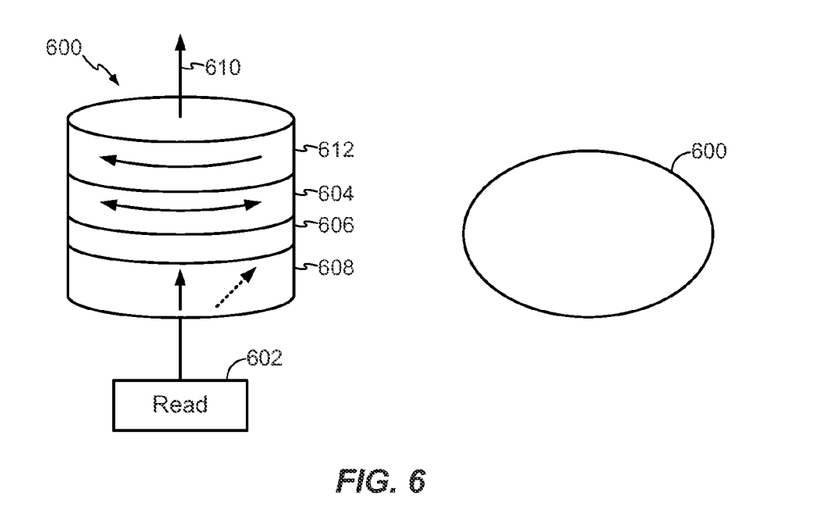
FIG. 6 illustrates an exemplary magnetic tunnel junction according to at least one embodiment of the invention.

FIG. 6 illustrates an exemplary MTJ according to at least one embodiment of the invention. MTJ 600 comprises at least a free layer 604, a barrier layer 606, and a reference layer 608. A current 610 generated by a read operation 602 passes through MTJ 600. MTJ 600 may be elliptical or circular when viewed from the perspective of current 610 as it enters MTJ 600.

In the embodiment of FIG. 6, the magnetization orientation of reference layer 608 is pinned out-of-plane (as shown by the vertical arrow) and the magnetization orientation of free layer 604 lies in-plane. With a small STT induced in current 610 from read operation 602, the perpendicularly polarized spin torque through the perpendicular reference layer 608 can cause the magnetization orientation of free layer 604 to precess around the perpendicular direction with a large component projected in-plane. The precession angle will be determined by the read STT current magnitude. The smaller the STT of current 610, the larger the precession angle with respect to the perpendicular axis, yet the smaller the precession frequency. Therefore, a very small STT from current 610, for example, slightly above zero, can easily cause the precession of the free layer 604 and make the random number sampling process viable. By inducing a perpendicular anisotropy in the free layer 604, the precession angle of the free layer 604 with respect to the perpendicular axis and precession frequency can be tuned.

Similar to MTJ 200 and MTJ 500, MTJ 600 does not require current 610 to be generated by a write operation. Rather, due to the particular magnetic configurations in MTJ 600, it is very easy to excite the magnetization of free layer 604 to precess in-plane with a slightly larger than zero STT current 610 during read operation 602. Also like MTJ 200 and MTJ 500, current 610 may be a DC.

In order to sense that MTJ 600 is in the high resistance state ("1") or low resistance state ("0"), another reference layer 612 is added to MTJ 600, interfacing with free layer 604. The magnetization orientation of reference layer 612 is pinned in-plane. Therefore, when the magnetization orientation of free layer 604 precesses in-plane, at a certain sampling frequency, the random relative magnetization direction between free layer 604 and reference layer 612 can be read out. Thermal fluctuations will add randomness to the free layer 604 magnetic precessions and makes its oscillation phase random.

Alternatively, the magnetization orientation of reference layer 608 can be tilted perpendicularly, as shown by the diagonal dashed line in FIG. 6. In this case, one tilted reference layer serves as both the spin filter layer and the sensing layer.

Figure 7:
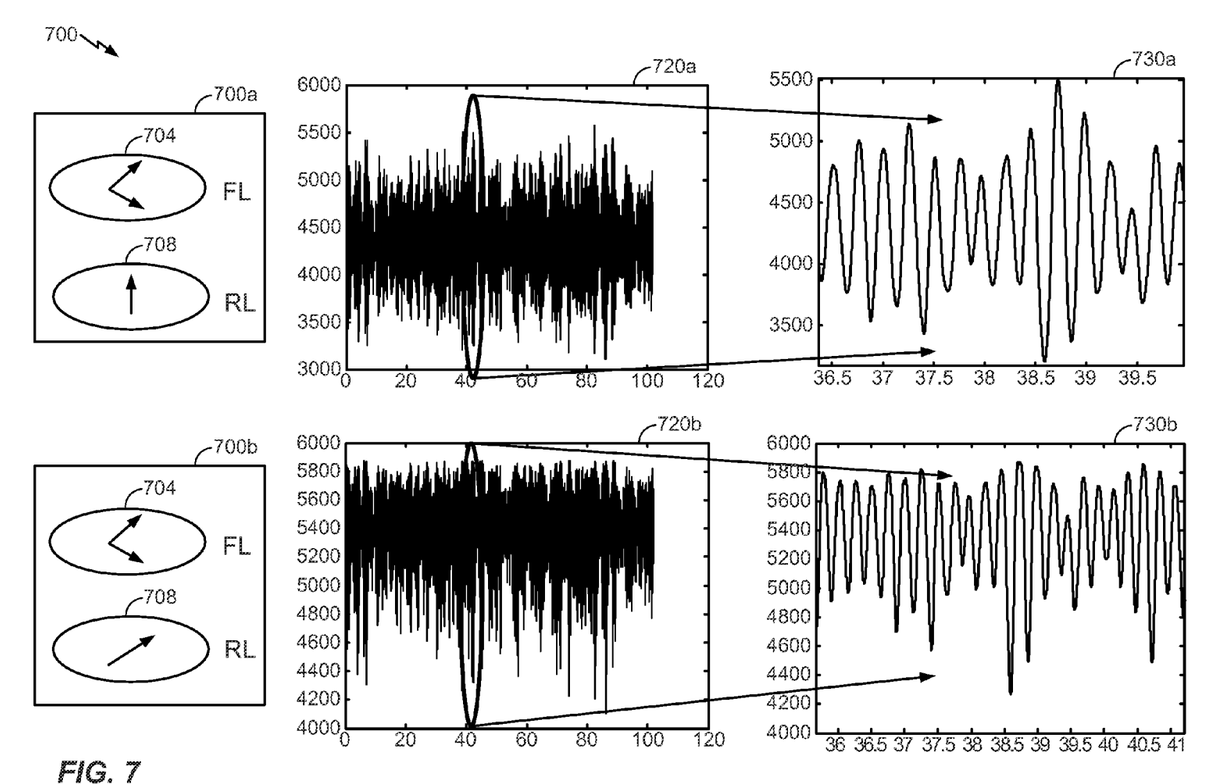
FIG. 7 illustrates an exemplary magnetic tunnel junction according to at least one embodiment of the invention.

FIG. 7 illustrates an embodiment of the invention that utilizes the precessional characteristics of STT switching in an MTJ 700 to generate random numbers. MTJ 700 comprises at least a free layer 704 and a reference layer 708.

In the configuration of 700a, the magnetization orientation of reference layer 708 is perpendicular to the magnetization orientation of free layer 704. The resulting resistance sampling is shown in graph 720a. Graph 730a shows a blowup of a portion of chart 720a. In the configuration of 700b, the magnetization orientation of reference layer 708 has been shifted to diagonal to the magnetization orientation of free layer 704. The resulting resistance sampling is shown in graph 720b. Graph 730b shows a blowup of a portion of chart 720b.

Figure 8:
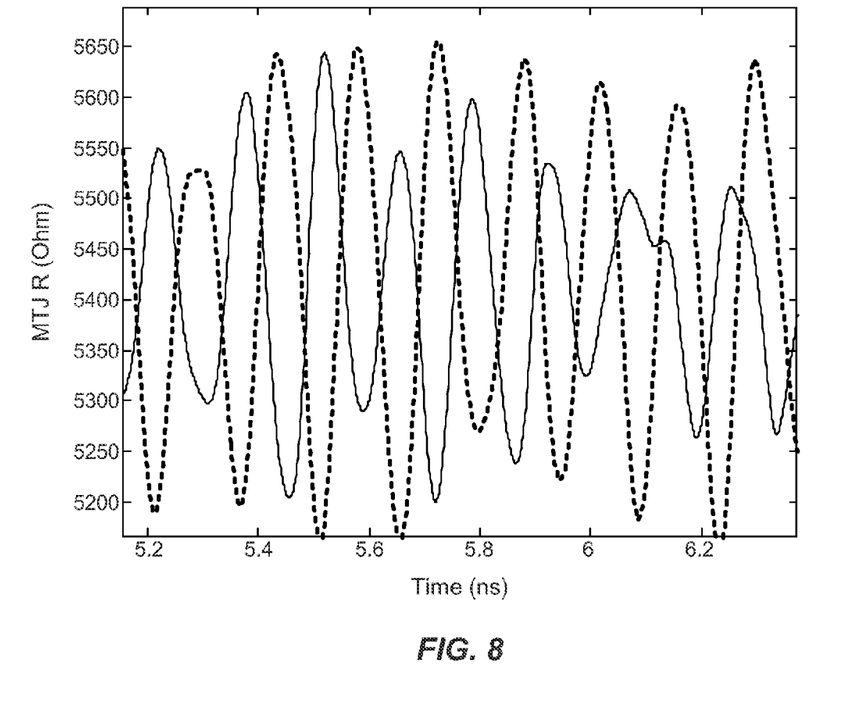
FIG. 8 illustrates two different precessional outputs according to at least one embodiment of the invention.

The phase of the magnetization precession is random. FIG. 8 illustrates two different precessional outputs as generated by MTJ 700.

Unlike MTJ 200 and MTJ 500, MTJ 700 requires an STT to excite the precession of free layer 704. The read current will be spin polarized by the magnetization in reference layer 708. Similar to MTJ 200 and MTJ 500, however, MTJ 700 does not require the current to be generated by a write operation because the current of a read operation is sufficient to change the magnetization orientation of free layer 704. Likewise, the current from the read operation may be DC. Further, there is no limitation on the in-plane shape design.

Figure 9:
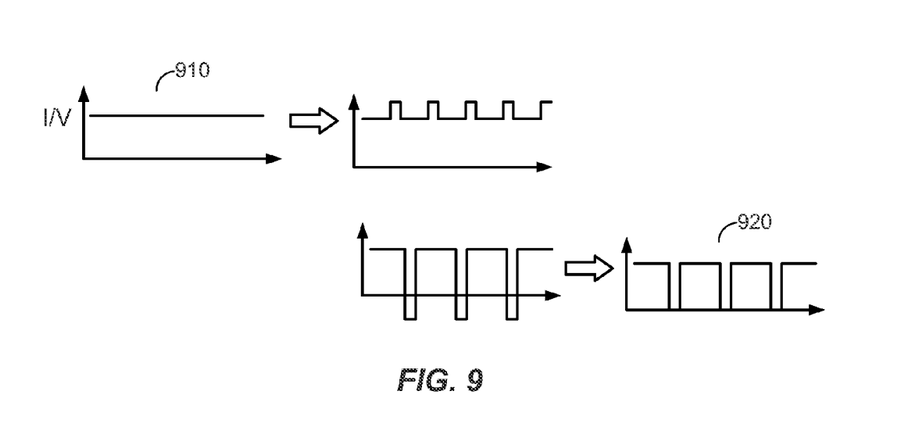
FIG. 9 illustrates two examples of a random phase jittering source according to at least one embodiment of the invention.

In a variation of the embodiment of FIG. 7, a jitter can be added to disturb the magnetization precession phase. FIG. 9 illustrates two examples of the random phase jittering source. In the example illustrated by graph 910, at a particular frequency, the read power source amplitude is changed. In the example illustrated by graph 920, at a particular frequency, the direction of the read power source is reversed or the read power source is turned off.

Figure 10:
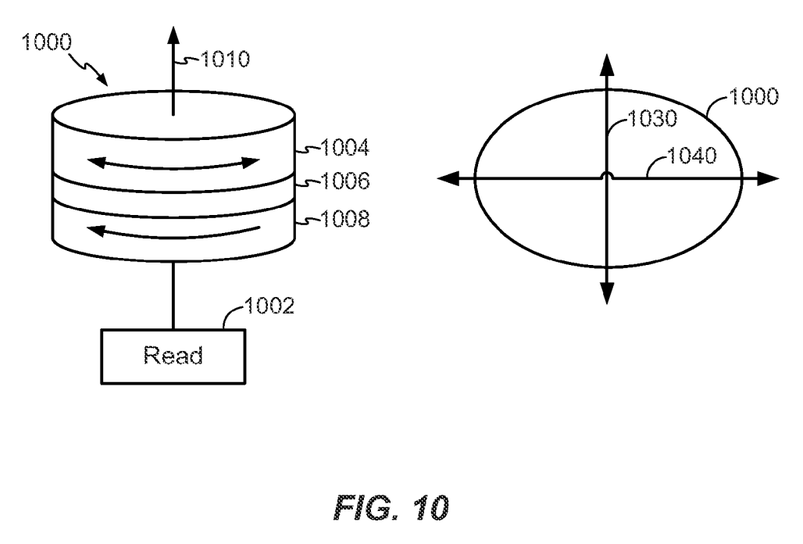
FIG. 10 illustrates an exemplary magnetic tunnel junction according to at least one embodiment of the invention.

FIG. 10 illustrates an exemplary MTJ according to at least one embodiment of the invention. MTJ 1000 comprises at least a free layer 1004, a barrier layer 1006, and a reference layer 1008. A current 1010 generated by a read operation 1002 passes through MTJ 1000. MTJ 1000 is elliptical when viewed from the perspective of current 1010 as it enters MTJ 1000. Like MTJ 500, the aspect ratio of MTJ 1000 is between 1 and 1.6.

In the embodiment of FIG. 10, however, a small STT is produced in current 1010 to excite the magnetization precession of free layer 1004 during read operation 1002. Also like MTJ 500, anisotropy is induced along the short axis. Thus, the effective anisotropy of MTJ 1000 becomes 0 because the shape anisotropy along long axis 1040 contradicts the induced anisotropy along short axis 1030.

Similar to MTJ 200 and MTJ 500, MTJ 1000 does not require current 1010 to be generated by a write operation because the magnetization orientation of free layer 1004 is unstable enough that the current 1010 of a read operation is sufficient to change the magnetization orientation of free layer 1004. Likewise, current 1010 from the read operation may be DC.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for generating a random number series. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of generating a random number, comprising:
passing a current from a read operation through a magnetic tunnel junction (MTJ) to cause a first magnetization orientation of a free layer to switch to a second magnetization orientation, the switch in magnetization orientation causing a change in a resistance of the MTJ;
wherein a damping constant of the MTJ is increased to minimize or eliminate an amount of spin transfer torque (STT) applied to the free layer by the current;
wherein the MTJ is circular or elliptical in at least one plane to minimize or eliminate the energy barrier between the first and the second magnetization orientations of the free layer; and
periodically sampling the resistance of the MTJ to generate a bit value for the random number.

2. The method of claim 1, wherein the free layer has a thickness greater than 2 nanometers.

3. The method of claim 1, wherein a reference layer of the MTJ has a thickness less than 2 nanometers.

4. The method of claim 1, wherein the damping constant of the MTJ is greater than or equal to 0.1.

5. The method of claim 4, wherein the MTJ further comprises a capping layer of platinum proximate the free layer to increase the damping constant.

6. The method of claim 1, wherein an energy barrier between the first and the second magnetization orientations of the free layer is close to 0.

7. The method of claim 1, wherein a diameter of at least one circular plane of the MTJ is from 40 to 100 nanometers.

8. The method of claim 1, wherein an aspect ratio of at least one elliptical plane of the MTJ is greater than 1 and less than or equal to 1.6.

9. The method of claim 1, wherein anisotropy is induced along a short axis of the at least one elliptical plane of the MTJ.

10. The method of claim 9, wherein an effective anisotropy of the MTJ is substantially 0 by contradicting a shape anisotropy along a long axis of the at least one elliptical plane of the MTJ with the induced anisotropy along the short axis of the at least one elliptical plane of the MTJ.

11. The method of claim 1, wherein the induced anisotropy along the short axis is produced by creating a stress along the short axis.

12. The method of claim 1, further comprising:
generating a small amount of spin polarization in the current to excite magnetization precession of the free layer.

13. The method of claim 1, wherein a magnetization orientation of a first reference layer of the MTJ is fixed out-of-plane to an in-plane orientation of the free layer.

14. The method of claim 13, wherein the fixed out-of-plane magnetization orientation of the first reference layer is perpendicular to the in-plane orientation of the free layer.

15. The method of claim 13, wherein the fixed out-of-plane magnetization orientation of the first reference layer is diagonal to the in-plane orientation of the free layer.

16. The method of claim 13, wherein the MTJ further comprises a second reference layer proximate the free layer.

17. The method of claim 16, wherein a magnetization orientation of the second reference layer is parallel or anti-parallel to a magnetization orientation of the free layer.

18. The method of claim 13, further comprising:
generating a small amount of spin polarization in the current to apply a spin-transfer torque (STT) to the free layer.

19. The method of claim 18, wherein the spin polarization causes the first and/or the second magnetization orientation of the free layer to precess perpendicular to the in-plane orientation of the free layer.

20. The method of claim 1, wherein the current is a direct current.

21. The method of claim 1, wherein the current causes the first magnetization orientation of the free layer to switch to the second magnetization orientation of the free layer randomly.

22. The method of claim 1, wherein the first and second magnetization orientations of the free layer are parallel and anti-parallel, respectively, to a magnetization orientation of a reference layer of the MTJ.

23. An apparatus for generating a random number comprising:
a magnetic tunnel junction (MTJ), comprising:
a free layer;
a reference layer; and
a barrier layer between the free layer and the reference layer,
wherein passing a current from a read operation through the MTJ causes a first magnetization orientation of the free layer to switch to a second magnetization orientation, wherein the switch in magnetization orientation causes a change in a resistance of the MTJ;
wherein a damping constant of the MTJ is increased to minimize or eliminate an amount of spin transfer torque (STT) applied to the free layer by the current; and
wherein the MTJ is circular or elliptical in at least one plane to minimize or eliminate the energy barrier between the first and the second magnetization orientations of the free layer.

24. The apparatus of claim 23, wherein the free layer has a thickness greater than 2 nanometers.

25. The apparatus of claim 23, wherein the reference layer of the MTJ has a thickness less than 2 nanometers.

26. The apparatus of claim 23, wherein a damping constant of the MTJ is greater than or equal to 0.1.

27. The apparatus of claim 26, further comprising:
a capping layer of platinum proximate the free layer of the MTJ to increase the damping constant.

28. The apparatus of claim 23, wherein an energy barrier between the first and the second magnetization orientations of the free layer is close to 0.

29. The apparatus of claim 23, wherein a diameter of at least one circular plane of the MTJ is from 40 to 100 nanometers.

30. The apparatus of claim 23, wherein an aspect ratio of at least one elliptical plane of the MTJ is greater than 1 and less than or equal to 1.6.

31. The apparatus of claim 23, wherein anisotropy is induced along a short axis of the at least one elliptical plane of the MTJ.

32. The apparatus of claim 31, wherein an effective anisotropy of the MTJ is substantially 0 by contradicting a shape anisotropy along a long axis of the at least one elliptical plane of the MTJ with the induced anisotropy along the short axis of the at least one elliptical plane of the MTJ.

33. The apparatus of claim 31, wherein the induced anisotropy along the short axis is produced by creating a stress along the short axis.

34. The apparatus of claim 23, wherein a small amount of spin polarization is generated in a current passing through the MTJ to excite a magnetization precession of the free layer.

35. The apparatus of claim 23, wherein a magnetization orientation of the reference layer of the MTJ is fixed out-of-plane to an in-plane orientation of the free layer.

36. The apparatus of claim 35, wherein the fixed out-of-plane magnetization orientation of the reference layer is perpendicular to the in-plane orientation of the free layer.

37. The apparatus of claim 35, wherein the fixed out-of-plane magnetization orientation of the reference layer is diagonal to the in-plane orientation of the free layer.

38. The apparatus of claim 35, further comprising:
a second reference layer proximate the free layer of the MTJ.

39. The apparatus of claim 38, wherein a magnetization orientation of the second reference layer is parallel or anti-parallel to a magnetization orientation of the free layer.

40. The apparatus of claim 35, wherein a small amount of spin polarization is generated in a current passing though the MTJ to apply a spin-transfer torque (STT) to the free layer.

41. The apparatus of claim 40, wherein the spin polarization causes the magnetization orientation of the free layer to precess perpendicular to the in-plane orientation of the free layer.

42. The apparatus of claim 23, wherein a current passing through the MTJ is a direct current.

43. The apparatus of claim 42, wherein the current causes the first magnetization orientation of the free layer to switch to the second magnetization orientation of the free layer randomly.

44. The apparatus of claim 23, wherein the first and second magnetization orientations of the free layer are parallel and anti-parallel, respectively, to a magnetization orientation of the reference layer of the MTJ.

45. An apparatus for generating a random number, comprising:
logic configured to pass a current from a read operation through a magnetic tunnel junction (MTJ) to cause a first magnetization orientation of a free layer to switch to a second magnetization orientation, the switch in magnetization orientation causing a change in a resistance of the MTJ;
wherein a damping constant of the MTJ is increased to minimize or eliminate an amount of spin transfer torque (STT) applied to the free layer by the current;
wherein the MTJ is circular or elliptical in at least one plane to minimize or eliminate the energy barrier between the first and the second magnetization orientations of the free layer; and
logic configured to periodically sample the resistance of the MTJ to generate a bit value for the random number.

46. An apparatus for generating a random number, comprising:
means for passing a current from a read operation through a magnetic tunnel junction (MTJ) to cause a first magnetization orientation of a free layer to switch to a second magnetization orientation, the switch in magnetization orientation causing a change in a resistance of the MTJ;
wherein a damping constant of the MTJ is increased to minimize or eliminate an amount of spin transfer torque (STT) applied to the free layer by the current;

wherein the MTJ is circular or elliptical in at least one plane to minimize or eliminate the energy barrier between the first and the second magnetization orientations of the free layer; and means for periodically sampling the resistance of the MTJ to generate a bit value for the random number.

47. A non-transitory computer-readable medium for generating a random number, comprising:

at least one instruction for passing a current from a read operation through a magnetic tunnel junction (MTJ) to cause a first magnetization orientation of a free layer to switch to a second magnetization orientation, the switch in magnetization orientation causing a change in a resistance of the MTJ;

wherein a damping constant of the MTJ is increased to minimize or eliminate an amount of spin transfer torque (STT) applied to the free layer by the current;

wherein the MTJ is circular or elliptical in at least one plane to minimize or eliminate the energy barrier between the first and the second magnetization orientations of the free layer; and at least one instruction for periodically sampling the resistance of the MTJ to generate a bit value for the random number.

* * * * *